(12) United States Patent
de Cesare et al.

(10) Patent No.: US 8,762,439 B2
(45) Date of Patent: Jun. 24, 2014

(54) SYSTEM AND METHOD FOR RANDOM NUMBER GENERATION USING ASYNCHRONOUS BOUNDARIES AND PHASE LOCKED LOOPS

(75) Inventors: Joshua Phillips de Cesare, Campbell, CA (US); Michael John Smith, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 526 days.

(21) Appl. No.: 13/086,996

(22) Filed: Apr. 14, 2011

(65) Prior Publication Data

US 2012/0265795 A1 Oct. 18, 2012

(51) Int. Cl.
*G06F 7/58* (2006.01)
(52) U.S. Cl.
USPC .......................................................... 708/250
(58) Field of Classification Search
None
See application file for complete search history.

(56) References Cited

U.S. PATENT DOCUMENTS

| | | | | |
|---|---|---|---|---|
| 6,892,337 B1 * | 5/2005 | Brophy et al. | | 714/739 |
| 7,034,654 B2 * | 4/2006 | Forest et al. | | 340/5.26 |
| 7,860,912 B1 * | 12/2010 | Gyugyi et al. | | 708/254 |
| 8,234,322 B2 * | 7/2012 | Saito | | 708/250 |
| 2005/0198091 A1 * | 9/2005 | Saito | | 708/250 |
| 2010/0146303 A1 * | 6/2010 | Kothari et al. | | 713/193 |

* cited by examiner

*Primary Examiner* — David H Malzahn
(74) *Attorney, Agent, or Firm* — Blakely, Sokoloff, Taylor & Zafman LLP

(57) ABSTRACT

Disclosed herein are systems, methods, and non-transitory computer-readable storage media for generating random data at an early stage in a boot process. A system practicing the method performs, by a processor based on a first clock, a group of reads of a counter running on a second clock to yield entropy words. In order to produce words with entropy, the system introduces a progressively increasing delay between each of the group of reads of the counter. The system generates entropy words by filling the buffer with successive reads of the least significant bit of the counter and then generates random data by applying a hash algorithm to the entropy words stored in the buffer.

24 Claims, 7 Drawing Sheets

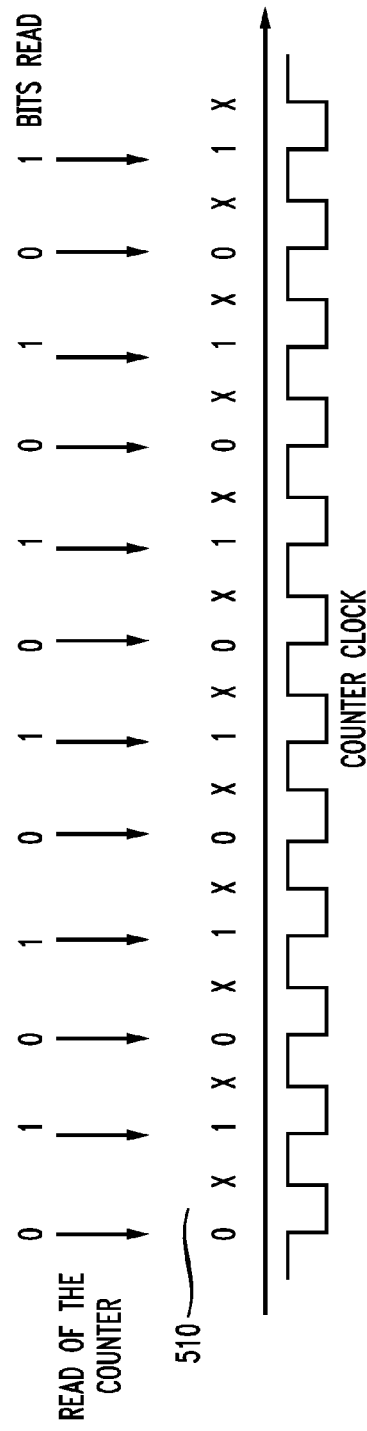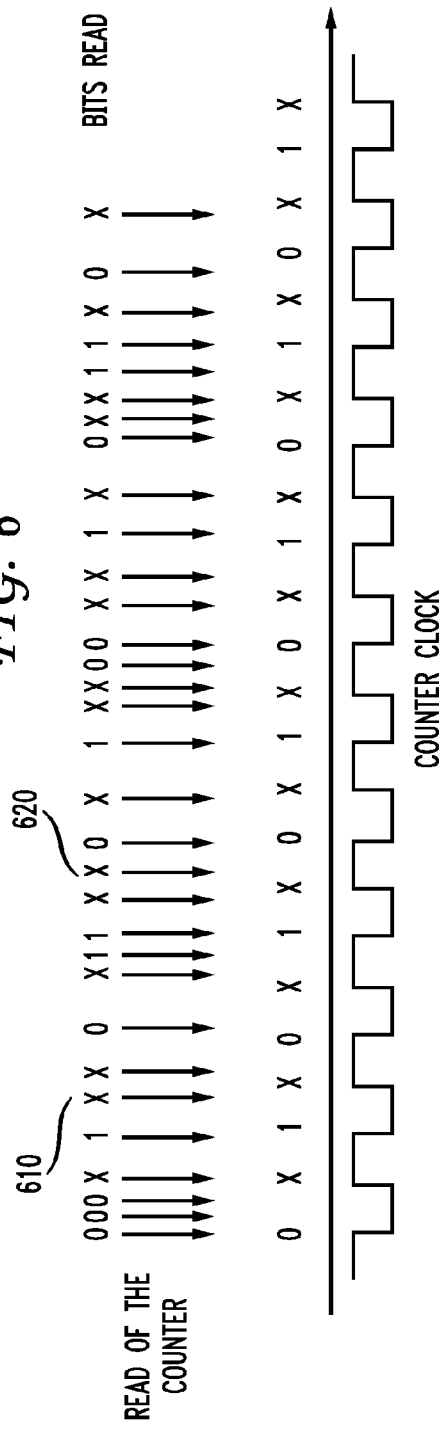

SYSTEM AND METHOD FOR RANDOM NUMBER GENERATION USING ASYNCHRONOUS BOUNDARIES AND PHASE LOCKED LOOPS

BACKGROUND

1. Technical Field

The present disclosure relates to random number generation and more specifically to random number generation using asynchronous boundaries and phase-locked loops (PLLs).

2. Introduction

Random number generation is a critical part of many security systems. Random number generators (RNGs) also have applications in gambling, statistical sampling and cryptography amongst others. In cryptography, RNGs are used to generate cryptographic keys. Random number generators are designed to generate numbers such that they appear random although numbers generated by deterministic processes are not completely random. A random number generator that is based on a deterministic computation is referred to as pseudo-random number generator (PRNG). An example of a PRNG is a linear congruential generator which produces a sequence of pseudorandom values defined by a recurrence relation. True random number generators measure a physical phenomenon expected to be random but lack the efficiency required by some applications. In these cases, PRNGs are used to generate random numbers.

The ability to generate random numbers early in the boot process has applications in secure booting and communications. The task of generating random numbers early in the boot process is difficult because sources of entropy are unavailable. Existing random number generators depend on outside influences such as key presses, mouse movements or a timestamp to generate random numbers or require additional software or unconventional circuitry to implement, and may be unavailable for applications in a very early boot stage of a device. These and other problems, such as cost and inefficiency, make existing RNGs undesirable for certain applications.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for random number generation using asynchronous boundaries and PLLs. A system implementing the method generates random data by performing, by a processor based on a first clock, a group of reads of a counter running on a second clock to yield entropy words. The system fills a buffer with the entropy words and generates random data by processing the entropy words stored in the buffer. The system generates entropy words by filling the buffer with successive reads of the least significant bit of the counter. The system fills the buffer with a predetermined number of entropy words and generates random data by applying a SHA-1 hash algorithm to the buffer.

The CPU performs counter reads after a progressively increasing delay to increase the likelihood that at least one counter read produces a bit with entropy. The counter is running from a first clock being read by a CPU running on a second clock, with an asynchronous boundary between the two clocks. At some point in the relative phase of the first and second clock, the least significant bit of the counter will race with the capture logic in the asynchronous boundary. When a read occurs during this window, the least significant bit of the counter can be used as entropy. The system generates an entropy word by iteratively reading the least significant bit of the counter and filling the buffer with the bits. The system can read other bits, but in many implementations, the least significant bit provides a maximum amount of unpredictability and thus can be favorable for generating random numbers.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 5 illustrates counter reads yielding no entropy data;

FIG. 6 illustrates counter reads yielding entropy data;

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for random number generation using asynchronous boundaries and PLLs. A system, method and non-transitory computer-readable media are disclosed which generate random numbers using asynchronous boundaries and PLLs. A brief introductory description of a basic general purpose system or computing device in FIG. 1 which can be employed to practice the concepts is disclosed herein. A more detailed description of random number generation using asynchronous boundaries and PLLs will then follow. One specific implementation of these principles is in the early stages of a boot process when other random number generation approaches are either entirely unavailable or their use is impractical.

Figure 1:
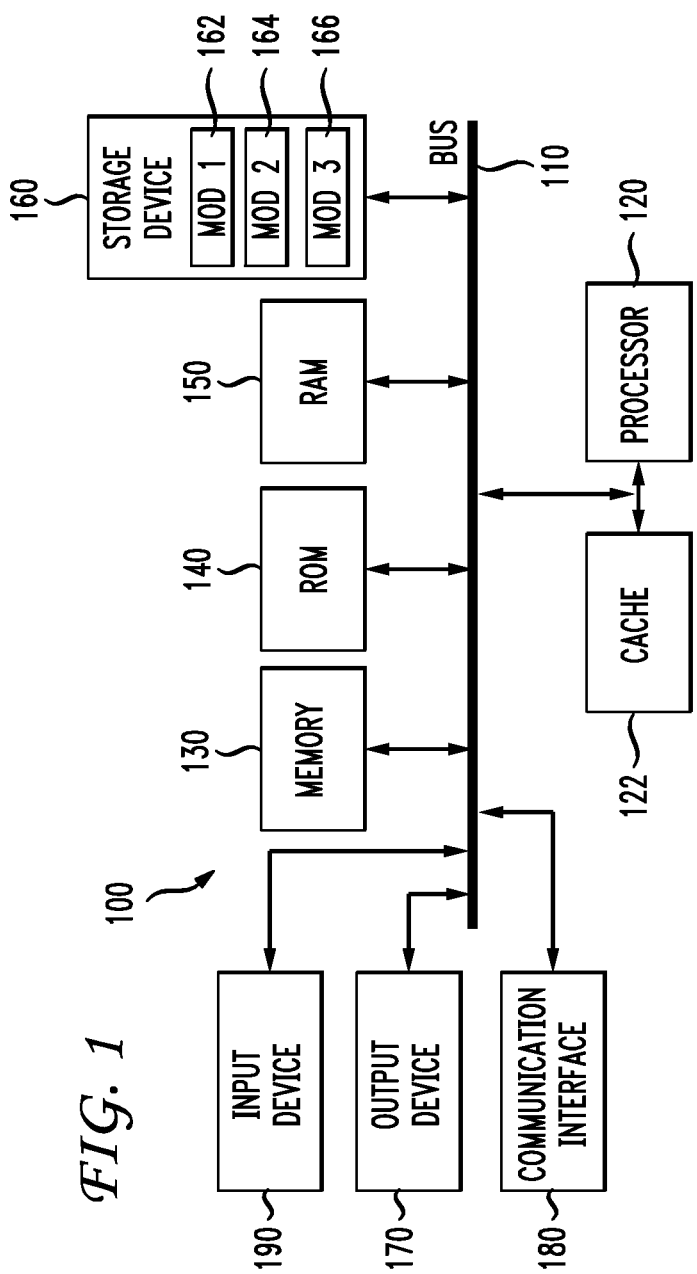
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example, the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
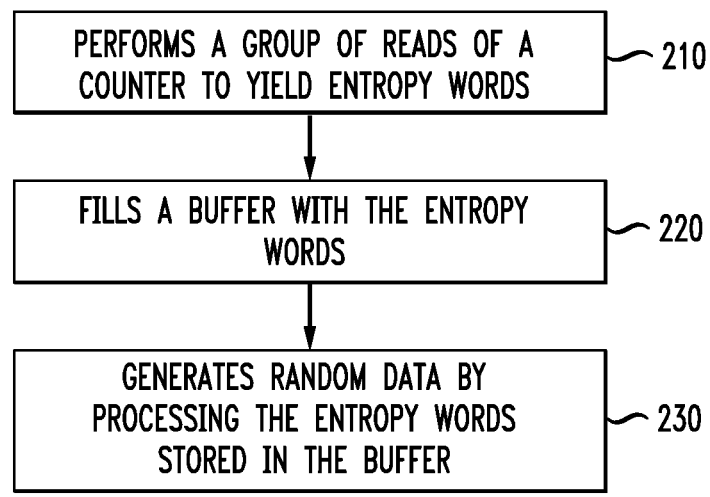
FIG. 2 illustrates an example random number generation method embodiment.

Having disclosed some basic system components and concepts, the disclosure now returns to a discussion of random number generation and turns specifically to the exemplary method embodiment shown in FIG. 2. For the sake of clarity, the method is discussed in terms of an exemplary system 100 as shown in FIG. 1 configured to practice the method. The steps outlined herein are exemplary and can be implemented in any combination thereof, including combinations that exclude, add, or modify certain steps.

FIG. 2 illustrates generating random data using asynchronous boundaries and PLLs. Phase locked loops can include analog or linear phase locked loops, digital phase locked loops, and/or software phase locked loops. A signal is considered asynchronous when no constant phase relationship exists between two clocks, such as two clocks running at different frequencies. There is an asynchronous boundary between the two clocks. Asynchronous boundary crossings have a window during which the boundary crossing behavior is not predictable. Approaching the window, the behavior is predictable, and after the window the behavior is predictable, but inside the window the behavior is unpredictable. Because asynchronous boundary crossings are unpredictable and cannot easily be replicated, extrapolated, or predicted, such crossings are suitable for generating random data.

An exemplary system-on-a-chip (SoC) contains a 64-bit counter that runs from an oscillator at 24 MHz to monitor the passage of time. The CPU runs at another frequency via a phase-locked loop (PLL). In one aspect, the CPU frequency is variable for power saving or other considerations. The CPU frequency can be based on the actual CPU cycles per second, or an external clock that governs the CPU's speed but operates at a lower frequency than the CPU. As an example, an external clock runs at 133 MHz, while the CPU operates at a 12× multiplier of the external clock (for a frequency of 1596 MHz) under full load and operates at a 5× multiplier of the external clock (for a frequency of 665 MHz) under minimal or no load. Any frequency associated with the CPU can be used. Clock A is the external oscillator, and clock B is generated by a PLL using clock A as a reference. The counter running from clock A is read by the CPU running on clock B. There is an asynchronous boundary between clock A and clock B because they run at different frequencies. The system 100 utilizes the asynchronous boundary between the clocks to generate random data. Asynchronous boundary crossings can be utilized in generating random data on both single and multi-core processors. In one aspect, the system can rely on processors other than a CPU, such as a co-processor, GPU, memory controller, memory, or any other clock-based microprocessor or integrated circuit.

In one aspect, generating random data using asynchronous boundaries and PLLs utilizes SoC technology. SoC technology is the packaging of all the electronic circuits and parts for an electronic system on a single integrated circuit (IC). Instead of building an electronic system by assembling components on a circuit board, the parts are fabricated together on a single chip. For example, an SoC for a sound-detecting device could include a receiver, analog-to-digital converter (ADC), a microprocessor and memory on a single microchip. Advantages of using SoC technology include lower costs, decreased size and reduced power consumption. The SoC can house the 64-bit counter read by the CPU when generating random data.

Figure 3:
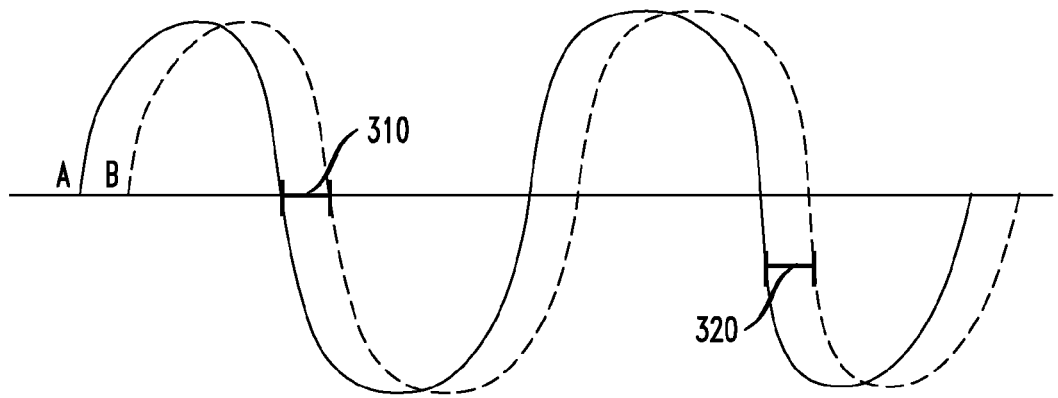
FIG. 3 illustrates phase difference between two signals.

Phase-locked loops (PLLs) can be used in conjunction with asynchronous boundaries in generating random data. A PLL compares the phases of two signals (one of which is a reference signal) and utilizes the phase difference to control the frequency of the loop. For example, two signals with the same frequency have a phase difference when the peaks and troughs of the signal occur at different times. FIG. 3 illustrates phase difference between signals A and B having the same frequency. Because signals A and B have the same frequency but are not in sync with each other, they have a constant phase difference. The difference in phase at 310 is the same as the difference in phase at 320.

Figure 4:
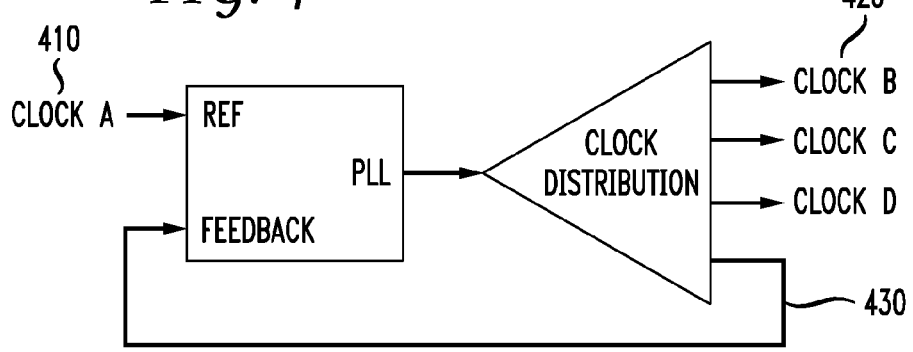
FIG. 4 illustrates an example phased-lock loop.

FIG. 4 illustrates a PLL utilized in generating random data. In generating random data, the system 100 utilizes clock A 410 as a reference signal for the PLL that generates clock B 420. One of the endpoints of the PLL is the PLL's feedback input 430. The system uses the feedback to compute the phase difference between the reference signal and the output of the PLL. In one implementation, clock A is the external oscillator and clock B is generated by a PLL using clock A as a reference, but the clocks can take other forms. For example, the system 100 can utilize a clock configuration that would produce asynchronous boundaries without a PLL. The clocks can be generated from two different (quartz) crystals, or any other sort of clock. If a counter was running from a 24 MHz clock and a processor running from a 27 MHz clock (optionally through a PLL) the reads from the processor would have to cross an asynchronous boundary in order to read the counter. Alternately, either of the clocks may be serving an existing purpose in a computing system and this functionality is implemented to take advantage of the existing clocks. The clocks can be electronic, mechanical, or take other forms. One advantage of using a PLL in generating random data is that relative jitter between the clocks A and B opens the entropy window, which increases the rate of producing random numbers.

A system 100 performs, by a processor based on a first clock, a group of reads of a counter running on a second clock to yield entropy words (210). In information theory, entropy is a measure of unpredictability, which is a highly desired attribute for random number generation. There is a point in the relative phase of the first clock and the second clock where the update of the least significant bit of the counter will race with the capture logic in the asynchronous boundary. The update of the counter races with the capture logic, making the exact timing of the update and the counter read unpredictable. When an asynchronous boundary crossing is functioning correctly, it will only allow a complete snapshot of the data cross the boundary. If the data is n bits wide, all n bits of the data must be from the same point in time relative to its source clock. In the case of a counter that is n bits wide, one or all of the bits could be changing on each of the source clocks as the change in value could carry from one bit to the next such as a counter having the binary value 00001111 that changes to 00010000. The asynchronous boundary can be designed such that the n bits are sampled into the destination clock domain at a time when none of the bits are changing. The relative jitter of the two clocks will move this stable period around producing uncertainty as to when the n bits will be sampled. In effect, the race is between the processor sampling the bits and the next change of the counter. If the counter read occurs in this window, the least significant bit can be used as entropy. There is no way for software to know where this window will be because the window timing depends on many factors including the frequency of the clocks, the voltage supplied to the silicon, how the silicon was processed, imperfections in the silicon, the ambient and/or surrounding temperature, and so on. While the disclosed methods can be implemented with a processor and software reading a counter, it could also be implemented with a hardware state machine taking the place of the processor and the software.

The counter reads are performed by the central processing unit (CPU) after a progressively increasing delay to ensure that at least one out of the counter reads produces a bit with entropy. If at least one counter read produces a bit with entropy, the resulting word has sufficient entropy. The system can insert progressive delays before the reads of the counter by the CPU so that the phase of the reads versus the counter is swept across the window where entropy is likely to be available. FIG. 5 illustrates counter reads yielding data with no entropy. The X's 510 represent counter reads that would collect entropy, however the reads do not occur during those time frames. If the read cadence was tuned and slightly offset, then every read would collect entropy. However, a temperature change, voltage change or process variation could shift the read cadence back to consistently reading bits with no entropy. Varying the cadence of the counter reads ensures or at least increases the likelihood of reading entropy bits. FIG.

6 illustrates counter reads yielding data with entropy. Swept reads (or reads with a varying cadence) find the unstable windows in the asynchronous boundary crossing and successfully read entropy data. Each run of X's 610, 620 would yield at most one bit of entropy.

Figure 7:
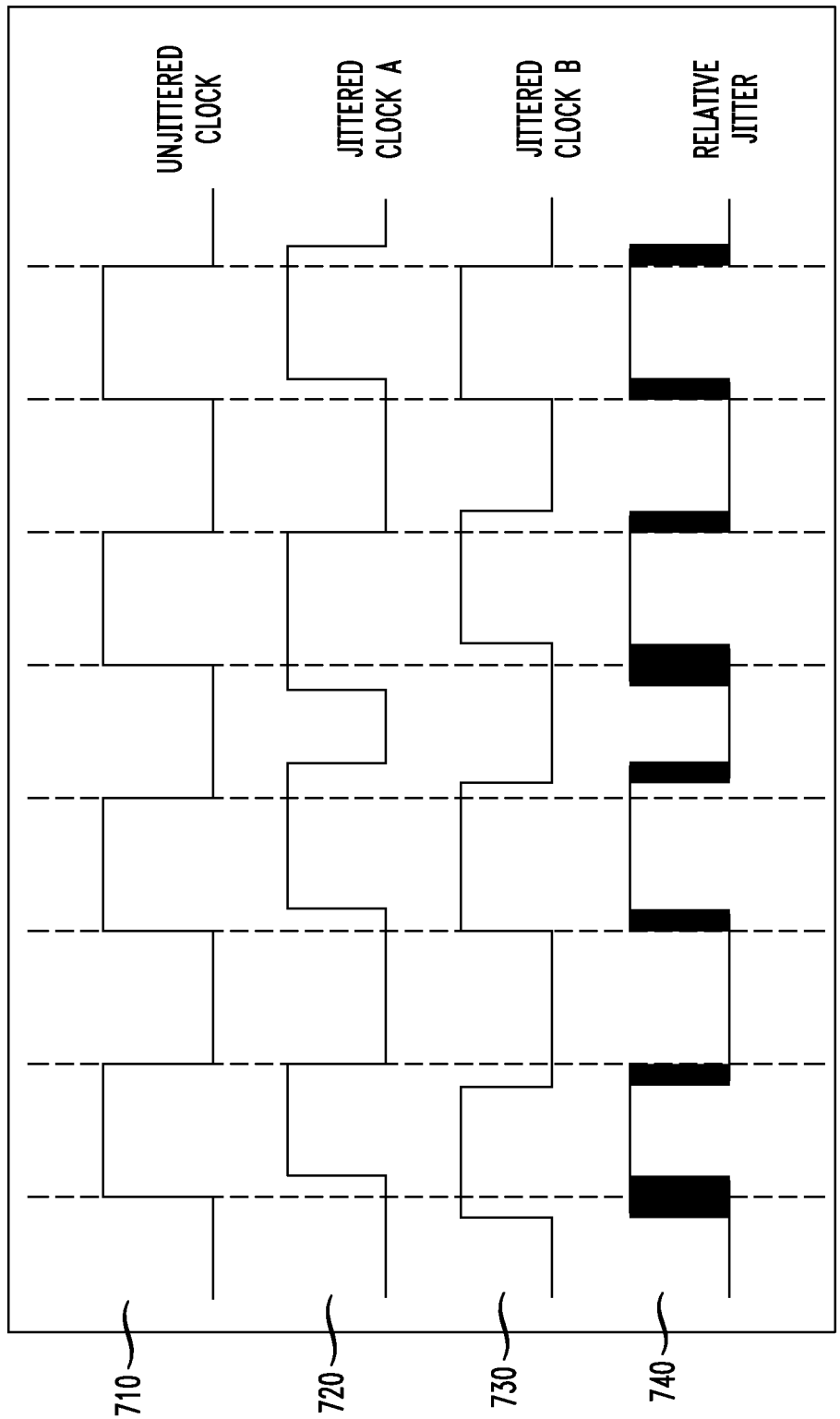
FIG. 7 illustrates clock jitter.

The relative jitter in the two clocks influences the size of the entropy window. In digital electronics, the term clock refers to a simple signal that can be a sequence of zeroes and ones that carries timing information. The clock can represent a basic measure of time. In practice, absolute precision and accuracy does not exist because clocks are never exact. However, many if not all clocks perform within a set of tolerances. Clock jitter is the variation from the threshold at which a periodic waveform is expected to cross at precisely timed moments. FIG. 7 illustrates clock jitter. An unjittered clock is presented 710 such that there is no variation from the expected output. The clock changes at precisely an expected time. Jittered clock A is presented 720 such that a periodic waveform does not cross every threshold at the expected moment. Some changes in the clock occur at the expected moment, but others are slightly too early or late. Jittered clock B is presented 730 such that a periodic waveform does not cross every threshold at the expected moment, and differs in the amount of jitter from clock A. The relative jitter between clock A and clock B 740 is indicated by the shaded areas. While FIG. 7 illustrates the relative jitter as occurring potentially at every cycle, the relative jitter can occur more or less regularly and individual occurrences of relative jitter can span multiple cycles. The size of the entropy window for reading the counter can be determined using the relative jitter between clock A and clock B and the entropy window can be increased by increasing the relative jitter between the two clocks. The system can use the PLL to add or decrease the amount of jitter. Jitter is added by slewing the PLL while the read loop is occurring or by other means specific to the PLL design. Other methods exist for increasing the window size such as varying the voltage or temperature, but these methods are riskier as an attacker can more easily control these variables outside of the SoC. Varying the voltage or temperature occurs more slowly than slewing the PLL, reducing the rate at which entropy can be gathered. These changes are frequently more easily subverted by an attacker trying to control the random numbers being produced by limiting the amount of entropy that is available to the random number generator.

Figure 8:
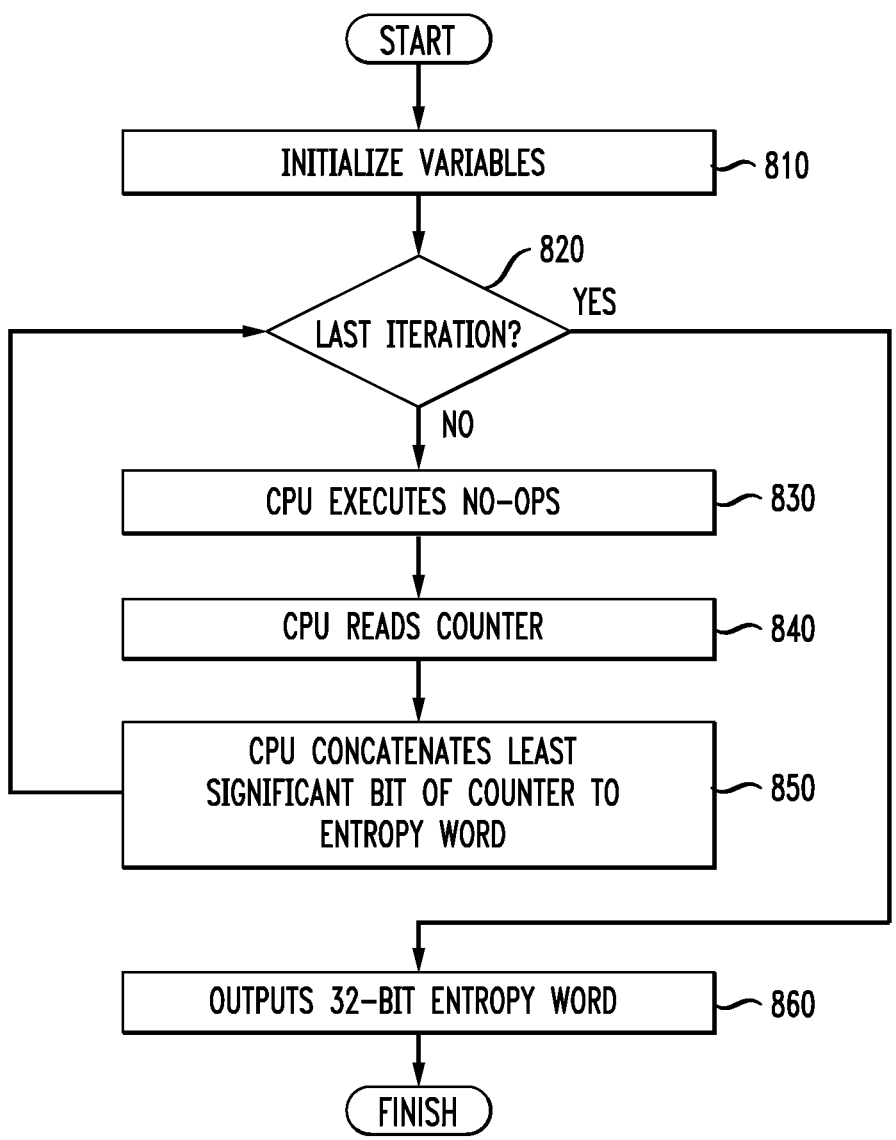
FIG. 8 illustrates an example random number generation system embodiment.

After the system performs a group of reads of a counter to yield entropy words, the system fills a buffer with the entropy words (220). The system can generate the entropy words by concatenating the least significant bits, for example, of each of the 32 counter reads to produce 32-bit entropy words. 32-bit entropy words are purely exemplary and other sizes of entropy words exist such as 64-bits. The size of entropy words should not be limiting in any way. FIG. 8 illustrates generating entropy words by iteratively executing no-ops as a read delay or performing any other delay tactic such as executing other instructions for a predetermined time, reading the counter and concatenating the least significant bit of the counter to the entropy word. Other methods to insert delay under programmable control exist such as a variable sequence of no-ops or decrementing an empty loop. On more complicated processors, a method such as requiring a sequence of instructions with interdependent results can be utilized such that the processor cannot optimize, and potentially bypass, their execution. The system initializes variables 810 such as loop counter, number of no-ops to perform and the entropy word. If it is not the last iteration of the loop 820, the CPU executes no-ops 830 corresponding to the loop iteration number. For example during the first loop iteration, the CPU executes one no-op, during the second loop iteration, the CPU executes two no-ops, and so on. One implementation increases the read delay linearly, however that is not required. The number of no-ops required depends on the effective read rate of the counter and the relative frequencies of the clocks. Both of these are known at design time and the same settings can be used on all instances of a given product or SoC. After the read delay, the CPU reads the counter 840 and concatenates the least significant bit (or other bit) of the counter to the entropy word 850. The least significant bit is used because the least significant bit is typically the most unstable bit out of the 32 bits. After the system executes the process 32 times (producing 32 bits) the system outputs 860 the 32-bit entropy word. Then the system fills a buffer with a predetermined number of entropy words. The size of the buffer depends on chip design but can be around 1000. On a sufficiently noisy system, 200 bytes of entropy data can be sufficient to produce one byte of good random data. Other buffer sizes and ratios of entropy data to random data exist and this exemplary buffer size should not be limiting in any way.

Figure 9:
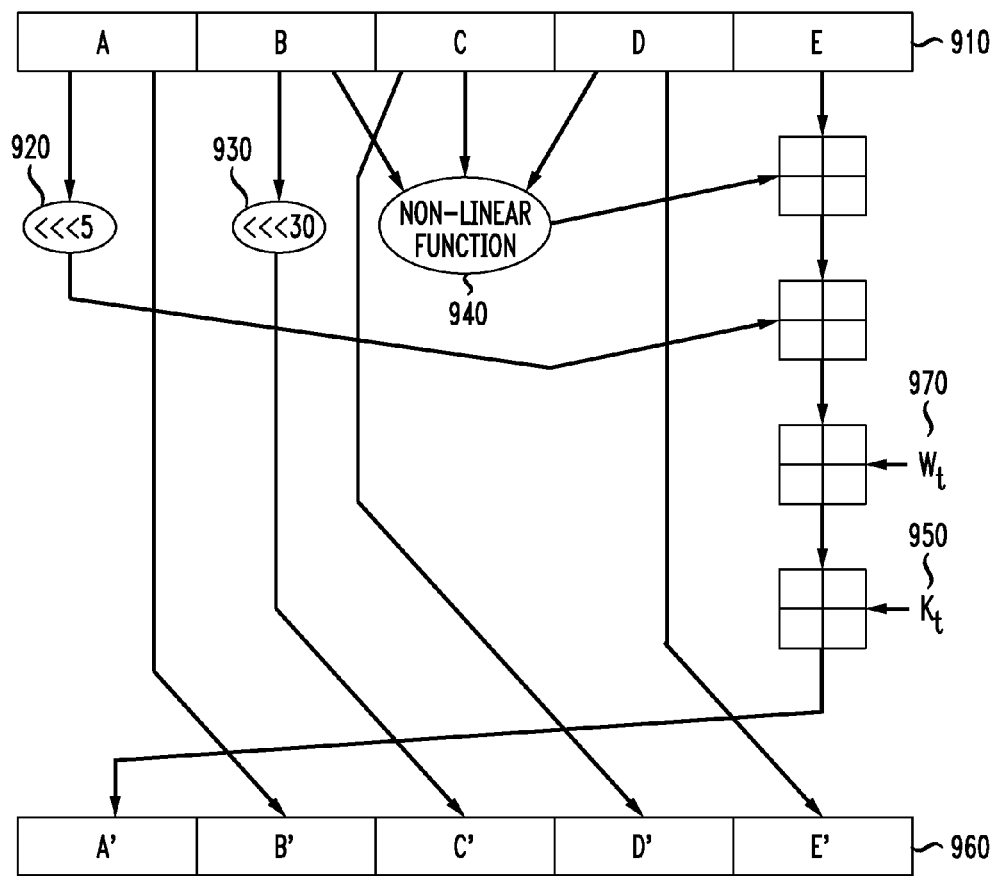
FIG. 9 illustrates the SHA-1 cryptographic hash algorithm.

Once the system fills the buffer with the required number of entropy words, the system generates random data (230) by applying a SHA-1 hash algorithm to the buffer. SHA-1 is an exemplary cryptographic hash function that produces a 20-byte digest, or output. A cryptographic hash function takes a block of data as input and returns a fixed-sized bit string. The number of times SHA-1 runs is a function of the input size. The maximum input size for SHA-1 is $2^{64}$ bits. FIG. 9 illustrates one round of SHA-1. The hash algorithm generates random data by initializing blocks A through E (910) and applying a number of bit shifts (920, 930), a combination (940) and modulo-2 additions (950) to generate the output blocks of random data A' through E' (960). The input to the hash, the buffer of entropy words, is used in the computation of $W_t$ (970) which is used to produce the output blocks. Although SHA-1 is one such algorithm for producing random data from entropy words, other algorithms exist such as MD4 and can be used to produce random data from entropy words.

In one implementation, the system generates random data using asynchronous boundaries and PLLs early in the boot process, producing a small amount of random data. However, the approaches disclosed herein can also be used later on in the life of a computing system such as generating cryptographic keys for encrypting communications and can be used to produce larger amounts of random data alone or in conjunction with other random number generation techniques.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply to generating entropy values of different sizes such as 16 or 64. Additionally, other cryptographic hash algorithms such as MD5 can be used to generate random data. Those skilled in the art will readily recognize various modifications and changes that may be made to the principles described herein without following the example embodiments and applications illustrated and described herein, and without departing from the spirit and scope of the disclosure.

We claim:

1. A method of generating random data, the method comprising:
performing, by a processing device, a plurality of reads of a counter running on a second clock to yield entropy words, wherein the plurality of reads of the counter are based on a first clock, and wherein each subsequent read of the plurality of reads is performed after a progressively increasing delay;
filling a buffer with the entropy words; and
generating random data by processing the entropy words stored in the buffer.

2. The method of claim 1, wherein the first clock is an external oscillator.

3. The method of claim 1, wherein the first clock and the second clock are asynchronous with respect to each other.

4. The method of claim 1, wherein the plurality of reads comprises 32 reads.

5. The method of claim 1, further comprising providing the random data to an application.

6. The method of claim 1, wherein the progressively increasing delay is relative to an immediately preceding read of the plurality of reads.

7. The method of claim 1, further comprising, in order to accomplish the progressively increasing delay, executing an increasing number of no-op instructions.

8. The method of claim 7, wherein the increasing number of no-op instructions is selected based on an effective read rate of the counter and relative frequencies of the first clock and the second clock.

9. The method of claim 1, wherein the second clock is generated by a phase-locked loop using the first clock as a reference.

10. The method of claim 9, further comprising skewing the phase-locked loop while performing the plurality of reads.

11. The method of claim 1, wherein the entropy words are generated by concatenating a least significant bit from each of the plurality of reads.

12. The method of claim 11, wherein the entropy words comprises 32 bits.

13. The method of claim 1, wherein random data is generated by applying a hash algorithm to the buffer.

14. The method of claim 13, wherein the hash algorithm is a Secure Hash Algorithm (SHA).

15. The method of claim 1, wherein generating the random data is performed at an early stage in a boot process.

16. The method of claim 1, wherein each of the plurality of reads corresponds to a bit in one of the entropy words.

17. A system for generating random data, the system comprising:
a processing device;
a buffer;
a boot module configured to control the processor to initiate a boot process of the system; and
a random number generation module configured to control the processing device to generate random data at an early stage of the boot process, the random number generation module comprising:
a first module configured to control the processing device to perform a plurality of reads of a counter running on a second clock to yield entropy words, wherein the plurality of reads of the counter is based on a first clock, and wherein each subsequent read of the plurality of reads is performed after a progressively increasing delay;
a second module configured to control the processor to store the entropy words in the buffer; and
a third module configured to control the processor to generate random data by processing the entropy words stored in the buffer.

18. The system of claim 17, wherein the random data is provided to an application.

19. The system of claim 17, wherein the entropy words are generated by concatenating a least significant bit from each of the plurality of reads.

20. A non-transitory computer-readable storage medium storing instructions which, when executed by a computing device, cause the computing device to generate random data, the instructions comprising:
performing, by a processing device, a plurality of reads of a counter running on a second clock to yield entropy words, wherein the plurality of reads of the counter are based on a first clock, and wherein each subsequent read of the plurality of reads is performed after a progressively increasing delay;
filling a buffer with the entropy word; and
generating random data by applying a hash algorithm to the buffer.

21. The non-transitory computer-readable storage medium of claim 20, wherein the first clock is an external oscillator.

22. The non-transitory computer-readable storage medium of claim 20, wherein the first clock and the second clock are asynchronous with respect to each other.

23. The non-transitory computer-readable storage medium of claim 20, wherein the plurality of reads comprises 32 reads.

24. The non-transitory computer-readable storage medium of claim 20, wherein the progressively increasing delay is relative to an immediately preceding read of the plurality of reads.

\* \* \* \* \*